United States Patent [19]

Crenshaw et al.

[11] Patent Number: 5,109,943
[45] Date of Patent: May 5, 1992

[54] MOTORCYCLE ENGINE STABILIZER

[76] Inventors: Rodney D. Crenshaw, 4103 Sapling La.; Bobby E. Goffe, 2227 Killebrey Ave.; John V. Masters, 315 Berckman Rd., all of Augusta, Ga. 30906

[21] Appl. No.: 552,189

[22] Filed: Jul. 13, 1990

[51] Int. Cl.$^5$ .............................................. B62M 7/06
[52] U.S. Cl. ................................... 180/228; 180/219; 123/195 A; 248/354.3
[58] Field of Search ....................... 180/219, 228, 300; 123/195 A, DIG. 6; 248/354.3, 638, 644

[56] References Cited

U.S. PATENT DOCUMENTS

| | | | |
|---|---|---|---|
| 679,555 | 7/1901 | Dufaux | 180/219 |
| 1,078,308 | 11/1913 | Pfleider | 180/219 |
| 2,172,473 | 9/1939 | Hartmann | 180/219 |
| 2,684,222 | 7/1954 | Miller | 248/354.3 |
| 2,743,783 | 5/1956 | Kreidler | 180/33 |
| 3,783,961 | 1/1974 | Hooper | 180/33 A |
| 4,323,135 | 4/1982 | Tominaga et al. | 180/228 |
| 4,424,877 | 1/1984 | Kawasaki | 180/228 |
| 4,550,698 | 11/1984 | Könnecker | 123/195 AC |
| 4,721,178 | 1/1988 | Ito | 180/219 |
| 4,809,801 | 3/1989 | Enoki et al. | 180/228 |

FOREIGN PATENT DOCUMENTS 0306967  11/1917  Fed. Rep. of Germany ...... 180/219

OTHER PUBLICATIONS

*SuperCycle*, Sep. 1988, pp. 34–39.

Primary Examiner—Charles A. Marmor
Assistant Examiner—Anne Marie Boehler
Attorney, Agent, or Firm—Nies, Kurz, Bergert & Tamburro

[57] ABSTRACT

A motorcycle engine stabilizer that is adapted to be positioned between the engine cylinder head and the motorcycle frame. The stabilizer includes an internally threaded sleeve that is adapted to receive an externally threaded adjustment rod that includes a cylindrical end adapted to bear against a frame tube surface adapter. The adjustment rod includes opposed flat surfaces adapted to permit a tool to engage the adjustment rod for threadedly extending it into or out of the sleeve. The frame tube surface adapter is positioned between the adjustment rod end and the frame. Rotation of the adjustment rod causes the surface adapter to engage a portion of the frame and causes the threaded sleeve base plate to engage the engine cylinder head, thereby providing additional support for the engine and reducing engine vibrations. A space plate having cooling channels can be positioned between the base plate and the engine cylinder head to prevent localized hot spots in the engine cylinder head.

11 Claims, 3 Drawing Sheets

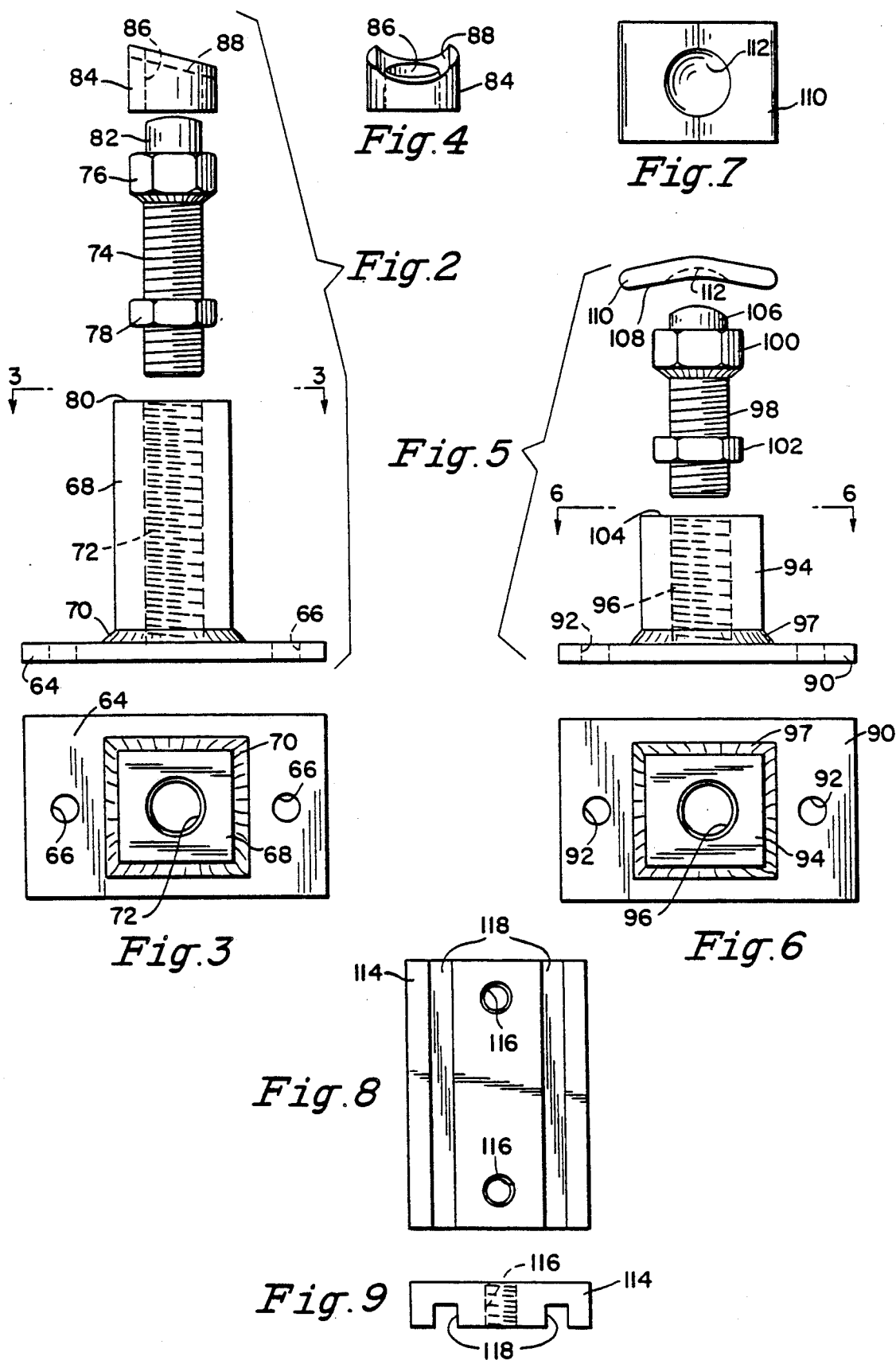

MOTORCYCLE ENGINE STABILIZER

BACKGROUND OF THE INVENTION

1. Field of the Invention

The present invention relates to supports for supporting motorcycle engines on a motorcycle frame, and more particularly to a motorcycle engine stabilizer structure for reducing the amplitude of vibration of such engines.

2. Description of the Related Art

Because motorcycle engines are usually either one cylinder or two cylinder engines, they inherently exhibit vibration when in operation. Although a certain level of vibrations can readily be tolerated, if the vibration amplitude or frequency example, on some engines high amplitude engine vibrations during operation can cause the cylinder head bolts to become loosened, thereby reducing engine power output by permitting leakage of fuel-air mixture from the cylinders and thereby reducing the compression pressure within the cylinders.

Various approaches have been conceived and attempted in the past to support such engines on a motorcycle frame in such a way that excessive vibrations are not produced. In that regard, motorcycle engines often have a gearbox, or power transmission, that is formed integrally with the engine and its crankcase, in order to save space. The mounting points for mounting the engine-gearbox assembly are generally on forward and rear portions of the gearbox. As a result, the cylinders, which extend upwardly and outwardly from the gearcase, and the heads of which are spaced some distance from the gearbox mounting points, often vibrate from side to side, relative to the motorcycle frame.

Various attempts have been made in the past in an effort to reduce the side to side vibrations of such engines. For example, in U.S. Pat. No. 4,323,135, which issued on Apr. 6, 1982, to Nobuyoshi Tominaga et al., there is disclosed a motorcycle engine and crankcase assembly in which the engine is a two cylinder, V-type engine, and wherein the respective engine cylinder heads are connected with the motorcycle frame by brackets that extend upwardly from the cylinder heads and pass through resilient bushings.

Another approach toward mounting an engine on a motorcycle in such a way that the engine is more securely supported to avoid lateral vibrations is shown in U.S. Pat. No. 4,550,698, which issued on Nov. 5, 1985, to Reinhard Konneker. As disclosed in that patent, each cylinder head includes a central support core to which a holding member is joined, and which extends to and is connected with the motorcycle frame. The holding member is in the form of a yoke-type bracket that is securely connected with the support core at one end and is bolted to the underside of the frame at its opposite end.

Although the provision of such mounting arrangements as are disclosed in the Tominaga et al. and Konneker patents identified above would appear to provide a solution to the excessive vibration problem, the structures disclosed in those patents cannot readily be incorporated onto motorcycles that lack supports that extend from the engine cylinders to the frame, and that lack corresponding connection points on the frame. Thus, one having a motorcycle that did not originally include such mounting arrangements would find it very difficult and cumbersome to attempt to adapt such solutions to an existing motorcycle. Additionally, neither of the Tominaga et al. or Konneker devices is adjustable and thus neither device can be applied to other motorcycles having different cylinder head to frame spacings.

It is therefore an object of the present invention to provide a stabilizer arrangement for motorcycle engines, wherein the stabilizer can be readily incorporated on existing motorcycles that did not originally contain connection points for such arrangements.

It is a further object of the present invention to provide an easily inserted stabilizer device that can be adapted to fit a wide variety of motorcycles having different engine cylinder head to motorcycle frame spacings.

It is a still further object of the present invention to provide a motorcycle engine stabilizer device that extends between the cylinder heads and the frame, and that is of adjustable length to change the vibration characteristics of the engine.

It is another object of the present invention to provide a simple, relatively inexpensive stabilizer device that does not require unusual tools for its installation.

SUMMARY OF THE INVENTION

Briefly stated, in accordance with one aspect of the present invention, a motorcycle engine stabilizer is provided for mounting between a motorcycle engine and a motorcycle frame for reducing engine vibrations. The stabilizer includes abase member that is adapted to be positioned on the engine cylinder head. An adjustable extension member is threadedly carried by the base member for movement into and out of the base member in a direction toward and away from the engine cylinder. An adapter is provided at the free end of the extension member for engagement with the motorcycle frame so that rotation of the extension member moves the adapter into engagement with the frame to provide a force against the engine to restrain vibration of the engine. A locking arrangement is provided for locking the extension member in a desired extended position relative to the base member.

BRIEF DESCRIPTION OF THE DRAWINGS

FIG. 2 is an exploded view showing an engine stabilizer in accordance with the present invention adapted to be used with the forwardmost cylinder of the motorcycle illustrated in FIG. 1.

FIG. 3 is a top view of a portion of the engine stabilizer of FIG. 2, taken along the line 3—3 thereof.

FIG. 4 is a rear view of an adapter for the engine stabilizer shown in FIG. 2 for use on a single tube frame element.

FIG. 5 is an exploded view of an engine stabilizer in accordance with the present invention adapted to be used with the rearmost cylinder of the motorcycle illustrated in FIG. 1.

FIG. 6 is a top view of a portion of the engine stabilizer of FIG. 5, taken along the line 6—6 thereof.

FIG. 7 is a bottom view of an adapter for the engine stabilizer shown in FIG. 5 for use with a two tube frame element.

FIG. 8 is a bottom view of a spacer plate for use with an engine stabilizer in accordance with the present invention.

FIG. 9 is an end view of the spacer plate of FIG. 8.

FIB. 12 is a fragmentary side view of an engine stabilizer in accordance with the present invention showing the orientation of cooling channels provided in the spacer plate, relative to cooling channels on the engine cylinder head.

DESCRIPTION OF THE PREFERRED EMBODIMENTS

Figure 1:
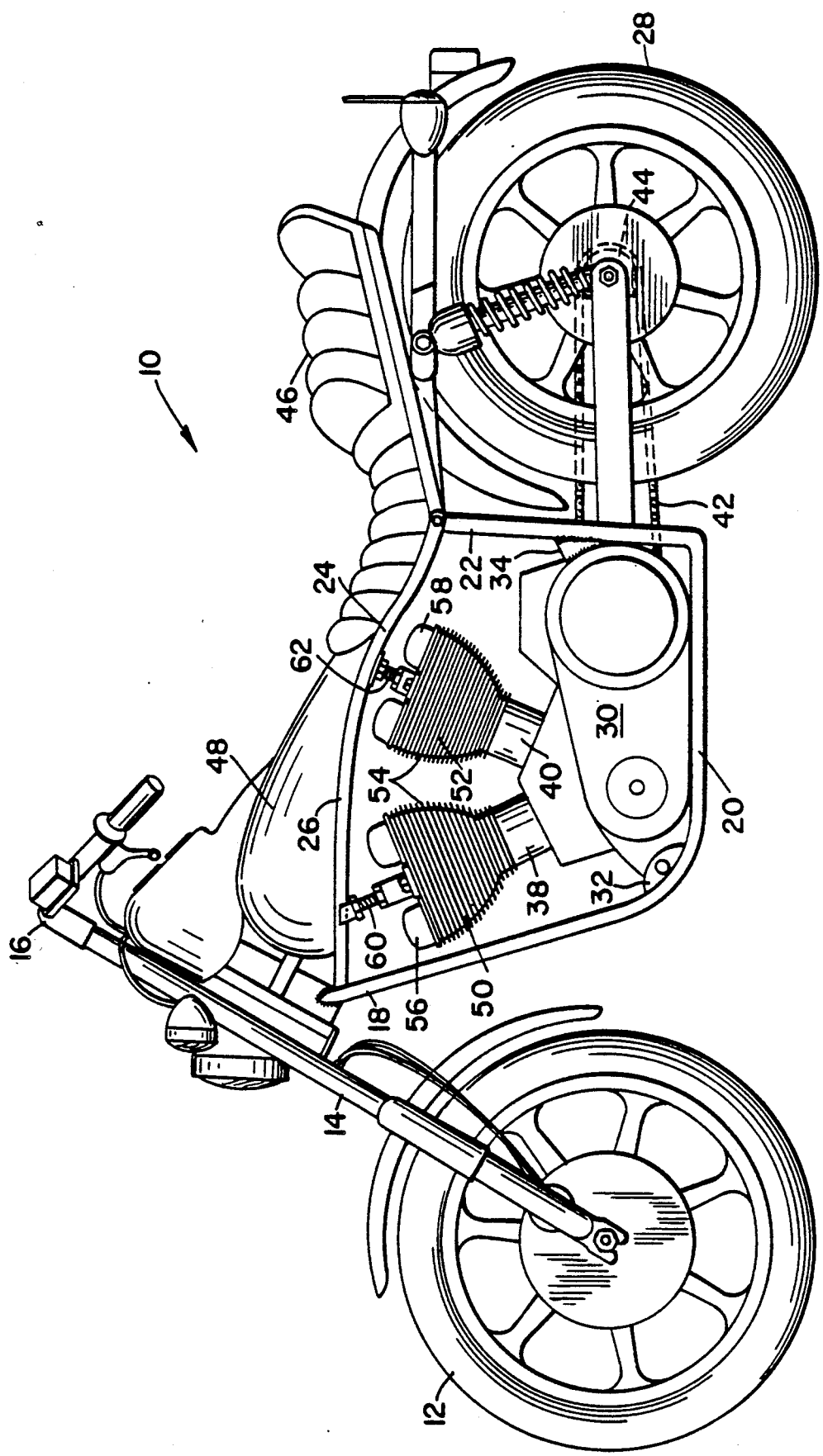
FIG. 1 is a side view of a motorcycle that has a two cylinder, V-type engine that includes engine stabilizers on each cylinder head in accordance with the present invention.

Referring now to the drawings, and particularly to FIG. 1 thereof, there is shown a motorcycle 10 that incorporates engine stabilizers made in accordance with the present invention. Motorcycle 10 includes a front wheel 12 that is rotatably carried on a steering fork 14 to which a handle bar 16 is connected for steering and control purposes. Steering fork 14 is pivotally supported at the upper end of a front frame member 18 that is part of a frame that lies in a longitudinally extending plane, and that includes a lower frame member 20, an upright frame member 22, a seat frame member 24, and a front frame bar 26. Each of the frame members are connected end to end to define the overall motorcycle frame, which extends rearwardly to also provide a support for a rear, driving wheel 28.

Lower frame member 20 supports a gearcase 30 that is secured to the frame at a front gearcase mount 32 and a rear gearcase mount 34. Connected to the forward end of gearcase 30 is an engine block 36 that includes a pair of upwardly extending engine cylinders 38, 40 that have their axes disposed in a V-type configuration. A drive chain 42 passes around a drive sprocket (not shown) carried by gearcase 30 and also passes around a driven sprocket 44 connected with rear wheel 28. A seat 46 and a gasoline tank 48 are also mounted on the frame.

Lower frame member 20 extends downwardly and rearwardly from approximately the connection between handle 16 and steering fork 14 to pass under gearcase 30. The rearmost end of lower frame member 20 is connected with the lower end of upright frame member 26 that is, in turn, connected at its upper end with seat frame member 24, that extends forwardly to connect with front frame bar 26. Seat frame member 24 is defined by a pair of side-by-side tubes that are joined at front frame bar 26 and that diverge rearwardly and outwardly.

Engine block 36 is positioned above and extends upwardly from gearcase 30. Front cylinder 38 extends in an upward and forward direction toward gasoline tank 48 and rear cylinder extends in an upward and rearward direction toward seat. The central axis of each cylinder lies in the central plane defined by the motorcycle frame. Each cylinder includes a cylinder head 50, 52, respectively, that carries a plurality of heat dissipating fins 54, and each cylinder head supports a respective rocker arm cover 56, 58 that overlies the rocker arms and other engine valve actuation elements (not shown). Rocker arm covers 56, 58 are U-shaped structures when viewed from above and include a pair of spaced legs that lie on either side of the central axis of the respective engine cylinders.

Between the legs of each rocker arm cover are positioned engine stabilizers in accordance with the present invention. As shown, the front cylinder includes a forward stabilizer 60 that extends between front cylinder head 50 and front frame bar 26. Similarly, the rear cylinder includes a rear stabilizer 62 that extends between rear cylinder head 52 and seat frame 24. Both the front and rear stabilizers serve to apply substantially axially directed forces against the respective cylinder heads, in a downward direction, and thereby serve to stabilize the cylinder heads and reduce the side-to-side vibrations that the engine would otherwise undergo. Furthermore, during warmup of the engine the stabilizer forces increase as a result of expansion of the engine parts by heating.

Referring now to FIGS. 2, 3, and 4, there is shown in enlarged detail the structure of front stabilizer 60. A generally rectangular base plate 64 is provided and includes a pair of spaced apertures 66 that lie on the longitudinal centerline of base plate 64 to permit mounting of the stabilizer to a spacer plate as will hereinafter be described. Secured to and extending upwardly from one face of base plate 64 is an internally threaded sleeve 68 that is securely fastened to base plate 68, such as by a weld 70. Sleeve 68 is a tubular structure, and although shown as of generally rectangular cross section, it can have any desired cross-sectional configuration, as desired.

Adapted to be threadedly received within threaded bore 72 in sleeve 68 is an externally threaded extension member 74 that includes a plurality of opposed flat surfaces 76, which can be provided in hexagonal form, as shown, to permit a wrench or other device to be applied to extension member 74 to turn it into or out of sleeve 68. A locking or jam nut 78 is carried by extension member 74 to engage with the top surface 80 of sleeve 68 to lock extension member 74 in a desired position.

The uppermost end of extension member 74 includes a cylindrical pin 82 that is adapted to slidably receive a frame tube adapter 84. A central bore 86 is provided in adapter 84 into which pin can be received. Adapter 84 also includes an inclined, curved or dished upper surface 88 to engage the outer surface of a tubular bar or rod, as will hereinafter be explained. Additionally, adapter 84 is freely rotatably carried on pin 82, so that final adjustment of the stabilizer can be made merely by turning extension member 74, and without the need to reorient adapter 84.

Referring now to FIGS. 5, 6, and 7, there is shown rear stabilizer 62, which is of substantially similar construction as is front stabilizer 60, except that it is shorter, because of the smaller distance between rear cylinder head 52 and seat frame 24. A generally rectangular base plate 90 is provided and includes a pair of spaced apertures 92 that lie on the longitudinal centerline of base plate 90 to permit mounting of the stabilizer to a spacer plate as will hereinafter be described. Secured to and extending upwardly from one face of base plate 90 is an internally threaded sleeve 94 that is securely fastened to base plate 90, such as by a weld 97. Sleeve 94 is a tubular structure, and although shown as of generally rectangular cross section, it can have any desired cross-sectional configuration, as desired.

Adapted to be threadedly received within threaded bore 96 in sleeve 94 is a externally threaded extension member 98 that includes a plurality of opposed flat surfaces 100, which can be provided in hexagonal form, as shown, to permit a wrench or other device to be applied to extension member 98 to turn it into or out of sleeve 94. A locking or jam nut 102 is carried by extension member 98 to engage with the top surface 104 of sleeve 94 to lock extension member 98 in a desired position.

The uppermost end of extension member 98 includes a cylindrical pin 106 that is adapted to engage the lower surface 108 of bearing plate 110, which has a V-type or V-shaped cross section and which is provided to bear against a two-tube frame element, as will be hereinafter explained. Bearing plate 110 has a centrally positioned recess 112 in lower surface 108 to engage with the rounded end surface of pin 106.

Both the front and rear stabilizer members are preferably made from cold rolled steel, or the like, for strength. To minimize possible wear between base plates 64 and 90 and the respective engine cylinder heads from vibrations when the stabilizer element is in place, a spacer plate 114 is provided, preferably having a structure as shown in FIGS. 8 and 9. Spacer plate 114 is preferably a material that is compatible with the cylinder head material, and it can be of the same material as that of the engine cylinder head (usually an aluminum alloy). Spacer plate 114 is a generally rectangular plate having an overall length and width substantially equal to the corresponding dimensions of base plates 64 and 90. Additionally, spacer plate 114 includes a pair of tapped holes 116 having their centers on the longitudinal centerline of the plate to receive mounting bolts to permit spacer plate 114 to be securely connected with the respective base plate. Additionally, to avoid the generation of localized hot spots on the engine cylinder head, spacer plate 114 preferably includes parallel cooling channels 118, which can be of any desired number and can be of generally rectangular shape as illustrated in FIG. 9.

Figure 10:
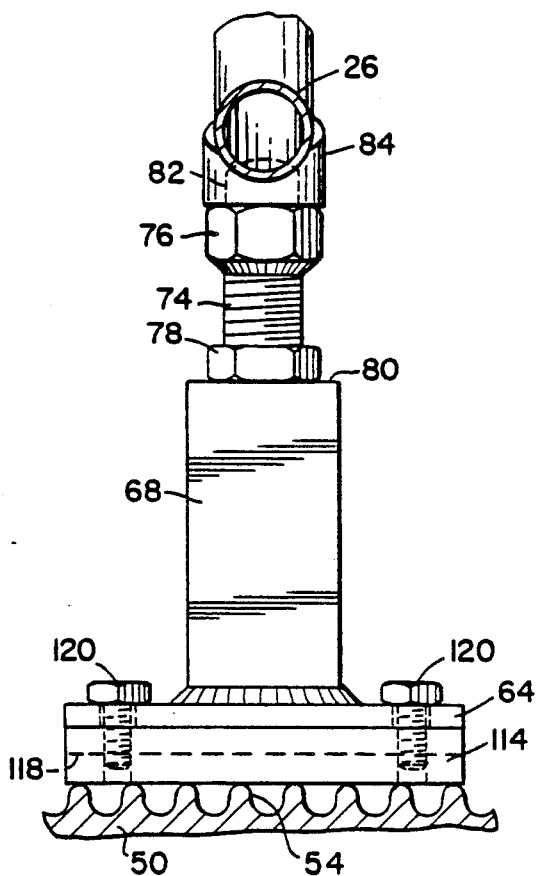
FIG. 10 is a rear view of an engine stabilizer in accordance with the present invention shown in position between a cylinder head and a single tube motorcycle frame element.
Figure 11:
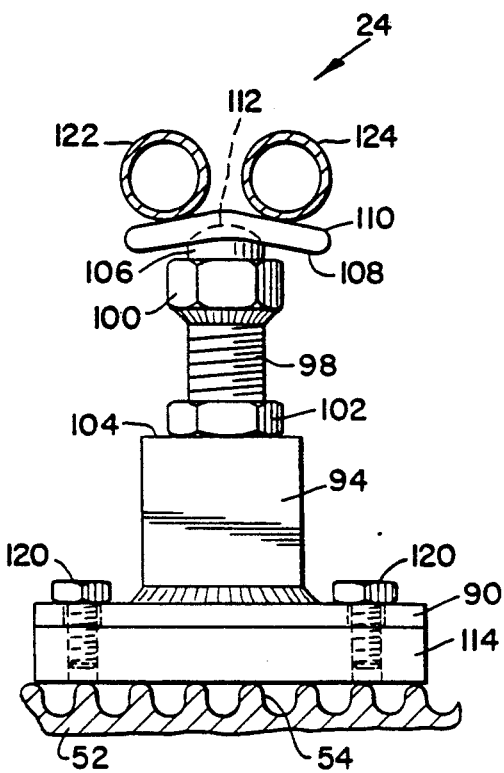
FIG. 11 is a front view of an engine stabilizer in accordance with the present invention shown in position between a cylinder head and a double tube motorcycle frame.
Figure 12:
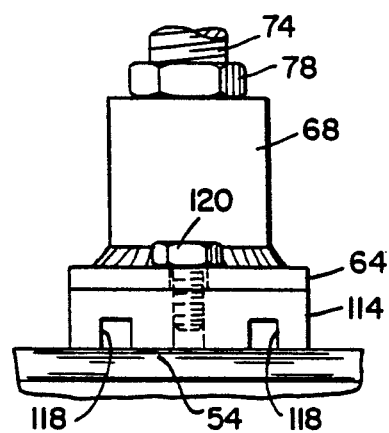

Referring now to FIGS. 10, 11, and 12, there is shown the positioning of the engine stabilizers of the present invention between the respective cylinder heads and frame members. In FIG. 10, which shows a front stabilizer, adapter member 84 engages a substantial peripheral portion of the single front frame bar 26 that extends from steering fork connection to the tubular seat frame 24 adjacent the rear portion of the gasoline tank 48 (see FIG. 1). Pin 82 extends into adapter 84, and locking nut 78 is in position against top surface 80 to securely lock the extension member relative to sleeve 68. Base plate 64 and spacer plate 114 are shown bolted together by bolts 120. Spacer plate 114 lies on the upper surface of cylinder head 50, which includes a plurality of parallel, spaced cooling fins 54.

The rear stabilizer is shown in position in FIG. 11, which shows an arrangement similar to that of FIG. 10 except that bearing plate 110 is positioned between pin 106 and the dual, side-by-side tubular members 122, 124 that define tubular seat frame 24. As will be appreciated, the size of bearing plate 110 is selected so that it can be used in conjunction with a tubular frame that can vary in regard to the lateral spacing of the tubular elements at a point above the rearmost cylinder.

FIG. 12 shows a side view of the front stabilizer member to show the perpendicular orientation of cooling grooves 118 in spacer plate 114, relative to the orientation of cooling fins 54 on the cylinder head. The same basic relationship exists with respect to the spacer plate and cooling fins on the rear stabilizer and rear cylinder.

It will be understood that the respective front and rear stabilizers as hereinabove described are adaptable to a wide variety of motorcycle frame and engine combinations, involving various spacings between the respective cylinder heads and the frame members. The respective extension members associated with each of the stabilizer members can readily be threadedly adjusted to adapt to a wide range of such spacings. Further, although described in terms of use with motorcycle engines, the present invention can also be used in other engine applications where engine vibration can be a problem.

The stabilizers in accordance with the present invention provide a convenient and inexpensive way to reduce the vibration of motorcycle engines relative to the frame, and thereby serve to extend the effective operating life of the engines by avoiding the harmful effects of excessive vibrations.

It will thus be observed that engine stabilizers in accordance with the present invention serve not to absorb vibrations through some resilient pads or bumpers, as in the prior art devices, but to more securely support the engine, to reduce engine vibrations, to transfer engine vibrations to the motorcycle frame, and to prevent engine vibrations from reaching frequency and amplitude levels that could shake parts of the engine loose or otherwise damage the engine.

Although particular embodiments of the present invention have been illustrated and described, it will be apparent to those skilled in the art that various changes and modifications can be made without departing from the spirit of the present invention. It is therefore intended to encompass within the appended claims all such changes and modifications that fall within the scope of the present invention.

What is claimed is:

1. A motorcycle engine stabilizer mounted between the cylinder head of a motorcycle engine and a motorcycle frame for reducing engine vibrations, said stabilizer comprising:

a. a base member positioned on the engine cylinder head at a point on the cylinder head that is opposed to and that faces a portion of the frame, the base member including a first threaded portion;

b. an adjustable extension member having a second threaded portion threadedly engagable with the first threaded portion and threadedly carried by the base member for movement in a direction toward and away from the engine cylinder head, the extension member having a free end facing the frame;

c. an adapter carried at the free end of the extension member, the adapter including an inwardly dished contact surface for surface engagement with only one side of a tubular member of the motorcycle frame so that rotation of the extension member relative to the base member moves the contact surface of the adapter into surface-to-surface engagement with the frame to provide a force against the engine cylinder head to restrain vibration of the engine; and d. a locking member for locking the extension member in a desired extended position relative to the base member.

2. A motorcycle engine stabilizer in accordance with claim 1, wherein the first threaded portion of the base member includes an internally threaded sleeve member that is secured to and extends from the base member, and the second threaded portion of the extension member includes an externally threaded rod that is threadedly engagable with the sleeve member.

3. A motorcycle engine stabilizer in accordance with claim 1, including a spacer plate positioned between the base member and the engine cylinder head.

4. A motorcycle engine stabilizer in accordance with claim 3, wherein the spacer plate is made from the same material as that of the engine cylinder head.

5. A motorcycle engine stabilizer in accordance with claim 3, wherein the spacer plate includes at least one recessed groove that faces the engine cylinder head to permit air movement between the cylinder head and the spacer plate.

6. A motorcycle engine stabilizer in accordance with claim 1, wherein the extension member includes an adapter carrier at the free end of the extension member for freely removably carrying the adapter.

7. A motorcycle engine stabilizer in accordance with claim 6, wherein the adapter carrier includes a rod portion.

8. A motorcycle engine stabilizer in accordance with claim 7, wherein the rod portion has a rounded end.

9. A motorcycle engine stabilizer in accordance with claim 1, wherein the adapter is freely rotatably carried on the extension member.

10. A motorcycle engine stabilizer mounted between the cylinder head of a motorcycle engine and a motorcycle frame for reducing engine vibrations, said stabilizer comprising:
  a. a base member positioned on the engine cylinder head at a point on the cylinder head that is opposed to and that faces a portion of the frame, the base member including a first threaded portion;
  b. an adjustable extension member having a second threaded portion threadedly engagable with the first threaded portion and threadedly carried by the base member for movement in a direction toward and away from the engine cylinder head, the extension member having a free end adapted to face the frame;
  c. an adapter carried at the free end of the extension member, the adapter including a contact surface for surface engagement with a side of the motorcycle frame so that rotation of the extension member relative to the base member moves the contact surface of the adapter into surface-to-surface engagement with the frame to provide a force against the engine cylinder head to restrain vibration of the engine, wherein the adapter includes a bearing plate having a V-shaped cross section to define a dished surface, and wherein the dished surface faces the extension member; and
  d. a locking member for locking the extension member in a desired extended position relative to the base member.

11. A motorcycle engine stabilizer in accordance with claim 10, wherein the dished surface includes a recess to receive the free end of the extension member.

* * * * *